June 24, 1930. L. J. CAHN Re. 17,713

FUSE PLUG

Original Filed July 17, 1925

INVENTOR.
Leon J. Cahn
BY Colton & Placher
ATTORNEY.

Reissued June 24, 1930

Re. 17,713

UNITED STATES PATENT OFFICE

LEON J. CAHN, OF NEW YORK, N. Y., ASSIGNOR TO NOMA ELECTRIC CORPORATION, OF NEW YORK, N. Y., A CORPORATION OF NEW YORK

FUSE PLUG

Original No. 1,639,077, dated August 16, 1927, Serial No. 44,208, filed July 17, 1925. Application for reissue filed August 15, 1929. Serial No. 385,984.

The present invention relates to improvements in fuse plugs, particularly base fuse plugs, and it is the principal object of the invention to combine a standard lamp base with a composition plug which uses an exchangeable fuse wire, so that the same plug may be used over again by the insertion of a new wire.

Another object of the invention is the provision of a fuse plug in which a readily exchangeable fuse wire is firmly guided to make contact with the shell and contact plate of the plug yet allowing a quick exchange of the wire.

A further object of the invention is the provision of an exchangeable wire for fuse plugs which may be used with the various types of plugs, as for instance hexagonal for up to 7 amperes and circular for over 7 amperes with equal efficiency.

These and other objects and advantages of my invention will become more fully known as the description thereof proceeds, and will then be specifically defined in the appended claims.

In the accompanying drawing, forming a material part of this disclosure:

Figure 1:
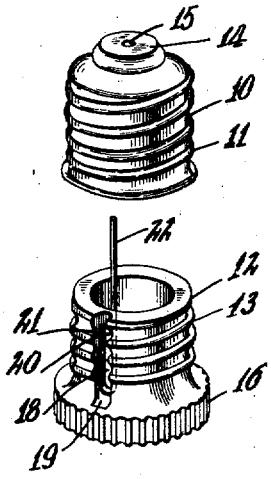
Figure 1 shows detail views of a plug shell and a plug socket separated therefrom, constructed according to the present invention, in which an exchangeable fuse is located.

The fuse plug constructed according to the present invention comprises the outer brass shell or mantle 10 having the usual thread 11, the outer one for screwing the plug into the socket of the fuse box, and the inner one for screwing the plug shell onto its socket member 12 of composition or any similar suitable insulating material, having its outer face threaded, as at 13, for engagement with the inner thread of the shell.

The contact plate 14 of the shell is attached to the end of the same in the usual manner and has a centrally located opening 15. The socket member 12 of the plug has a head or knob formed therewith, designated 16, the outer periphery of which is knurled or corrugated to facilitate the operation of the plug when screwing the same into a box socket or unscrewing it therefrom, etc. A mica or similar plate 17 rests upon an inner shoulder of the head part of socket member 12, and the side wall of the socket member is formed with a longitudinal slot 18 having its bottom wall beveled as at 19, while its upper end runs into a groove 20, the lower end of the wall of which is adapted to be engaged by the hook end 21 of a fuse wire 22, the upper end of which is engaging the hole or opening 15 and adapted to be held therein metallically in any suitable manner as indicated at 23. The mica plate 17 may be made of a number of layers, as illustrated on the drawing, and these layers are adapted to be held against displacement by the fuse wire 22. The very bottom of the hook end 21 engages in an aperture in the wall of the socket member 12, and bearing against the mica plates. When the fuse wire "blows out" it chars the mica discs 17. The fuse wire, and the mica disc may be replaced by new ones, and the new fuse wire will engage against the new mica discs to hold them against displacement.

Figure 2:
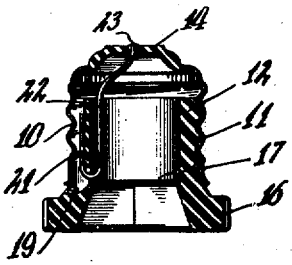
Figure 2 is a longitudinal sectional side elevation of a fuse plug constructed according to the present invention.
Figure 3:
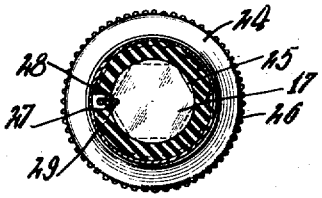
Figure 3 is a sectional view of a socket member for a plug adapted to be used with up to 7 amperes.
Figure 4:
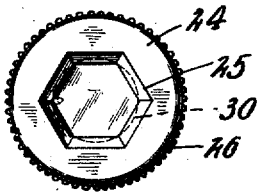
Figure 4 is a top plan view thereof.
Figure 5:
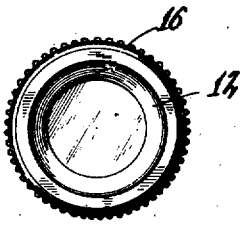
Figure 5 is a view similar to Figure 3 of a socket member of a plug adapted to be used with over 7 amperes.

The fuse plug illustrated in Figures 2 and 4 has the socket member 24 thereof formed with a hexagonal head part 25 and a knurled outer head flange 26, and its side wall has a longitudinal extending opening or slot 27 formed therein ending into an upper groove, the end wall 28 of which is adapted to be engaged by the hook-shaped end of a fuse wire 29 leading to the contact plate of the shell in which it is secured in the usual manner. The inner mica plate 30 is seated in the socket and held therein in any of the well known ways. The hexagonal form of plug head is used with up to 7 amperes, while the circular form as illustrated in Figure 5 is used with more or above 7 amperes.

Figure 6:
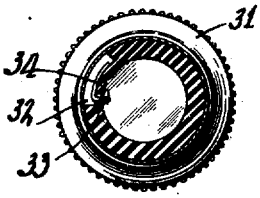
Figure 6 is a sectional view of a modified form of fuse plug.

In the modified form of the invention illustrated in Figure 6, the fuse plug socket member 31 is of the round or circular form and has its side wall formed with a horizontally extending slot 32, ending at one end into a vertical slot 33 so that the end of the wire 34 is guided about the outer mantle of the socket member, preferably in the threads thereof and held therein, while the opposite end of the wire is guided in slot 33 to above the contact plate in the usual manner.

While I have shown and described as an example the preferred form of my invention, a composition plug to be combined with a standard lamp base, the operation of which will be clear from the above description without further explanation, it is to be understood, that such changes as come within the scope of the appended claims, may be made without departure from the spirit of the invention and the principle involved.

In addition to the advantages specifically pointed out in the foregoing specification, it will be noted further that the fuse plug constructed in accordance with this invention is exceedingly simple in construction, comprising few and simple parts which may be easily assembled and disassembled, thus making for a comparatively cheap, compact and highly efficient structure.

Having thus described my invention, what I claim as new, and desire to secure by Letters Patent is as follows:—

1. A means for removably securing mica discs in fuse plugs, comprising a socket formed with an inner shoulder, mica discs resting on said inner shoulder, said socket having a longitudinal slot on the outer wall and an aperture adjacent said mica discs, communicating with said longitudinal slot, a fuse wire hooked through said aperture, and guided in said longitudinal slot, and a shell having its inner surface in contact with said fuse wire disposed over said socket, said mica discs being supported by frictioned engagement with the inner surface of said socket and by said fuse wire.

2. A fuse plug comprising a substantially tubular member formed with an inner shoulder and having an external longitudinal slot therein and an aperture through the walls thereof communicating with said slot and the interior of said tubular member, a shell adapted to be screw threaded on said tubular member, comprising an end contact plate for closing one end of said tubular member, a plurality of mica discs disposed in superimposed relation within said tubular member and engaging said shoulder for closing the other end of said tubular member, and a fuse wire attached at one end to said contact plate disposed through said aperture intermediate its ends and guided in said longitudinal slot in adjacency with the wall of said shell, said mica discs being restrained from inward movement by frictional engagement with the inner walls of said tubular member and by contact with said fuse wire.

3. A fuse plug comprising a substantially tubular member formed with an inner shoulder, an external longitudinal slot and an aperture communicating with said slot and the interior of said tubular member, a plurality of superimposed discs disposed in said tubular member in engagement with said shoulder, and a fuse wire disposed through said aperture and engaging said discs, said discs being restrained from outward movement relative to said tubular member by said shoulder and from inward movement by said fuse wire and by frictional engagement with the walls of said tubular member.

4. A fuse plug comprising a substantially tubular member having an inner support, a member fitted into said tubular member and resting on said support, said tubular member having an external slot communicating with interior of said tubular member, and a fuse wire extending into said tubular member and having a bent portion resting on said second member and extending from the interior of said tubular member into said slot.

5. A fuse plug comprising a substantially tubular member having an inner support, a member fitted into said tubular member and resting on said support, said tubular member having an external slot and a recess therein whereby communication is made between the interior of said tubular member and said slot, and a fuse wire extending into said tubular member and having a bent portion resting on said second member and extending from the interior of said tubular member through said recess into said slot.

6. A fuse plug comprising a substantially tubular member formed with an inner shoulder and having an external longitudinal slot therein and an aperture through the walls thereof communicating with said slot and the interior of said tubular member, a shell adapted to be screw threaded on said tubular member comprising an end contact plate for closing one end of said tubular member, a member fitted into said tubular member and engaging said shoulder, and a fuse wire attached at one end to said contact plate disposed through said aperture intermediate its ends and guided in said longitudinal slot in adjacency with the wall of said shell, said second member being restrained from inward movement by frictional engagement with the inner walls of said tubular member and by contact with said fuse wire.

7. A fuse plug comprising a tubular insulating member, light transmitting insulating means at one end of said member, said member having a slot on the outer surface thereof, a metallic shell received on said tubular member, and a fuse wire extending into said tube, and having a portion contacting said insulating means and a portion extending into said slot between said tubular member and shell.

8. A fuse plug comprising a tubular insulating member formed with an internal shoulder and an external screw threaded surface, a screw shell received on said screw threaded surface, a light transmitting insulating member within said tubular member seated on said shoulder and a fuse member having a portion within said tubular member contacting said light transmitting member and a portion extending between said tubular member and shell.

9. A fuse plug comprising a tubular insulating member, of uniform interior cross-sectional shape, formed with an internal shoulder and an external screw threaded surface, a screw shell received on said screw threaded surface, an insulating member within said tubular member seated on said shoulder and frictionally engaging the inner surface of said member, and a fuse member having a portion within said tubular member disposed adjacent said insulating member and a portion extending between said tubular member and shell.

Signed at New York city, county and State of New York, this 23rd day of May, 1930.

LEON J. CAHN.